Dec. 18, 1934.  A. M. DENHAM  1,984,466

SYSTEM OF MULTIPLE PHOTOTELEVISION

Filed Feb. 16, 1934  5 Sheets-Sheet 1

INVENTOR
Alfred M. Denham

Dec. 18, 1934.  A. M. DENHAM  1,984,466
SYSTEM OF MULTIPLE PHOTOTELEVISION
Filed Feb. 16, 1934   5 Sheets-Sheet 2
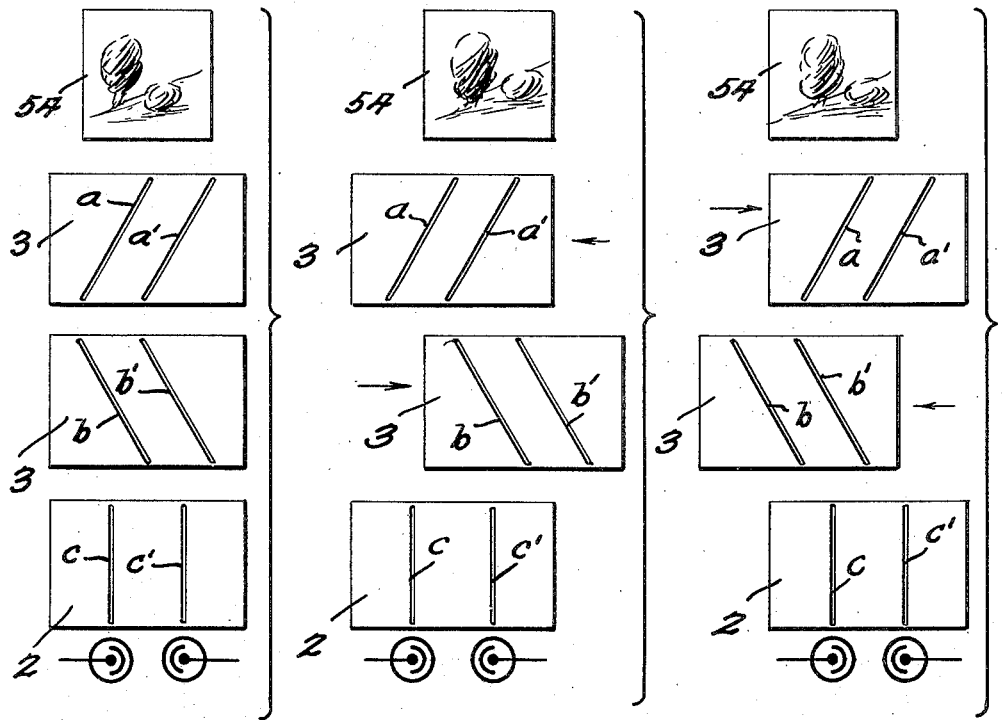
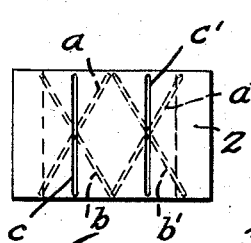
Fig. 11.
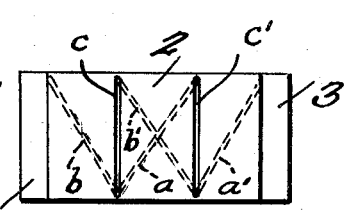
Fig. 12.
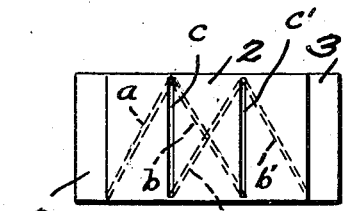
Fig. 13.
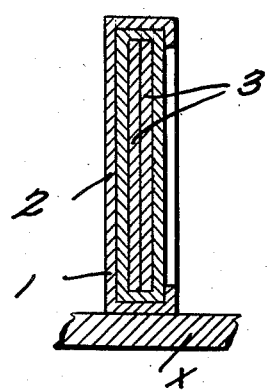
Fig. 14.
INVENTOR
Alfred M. Denham

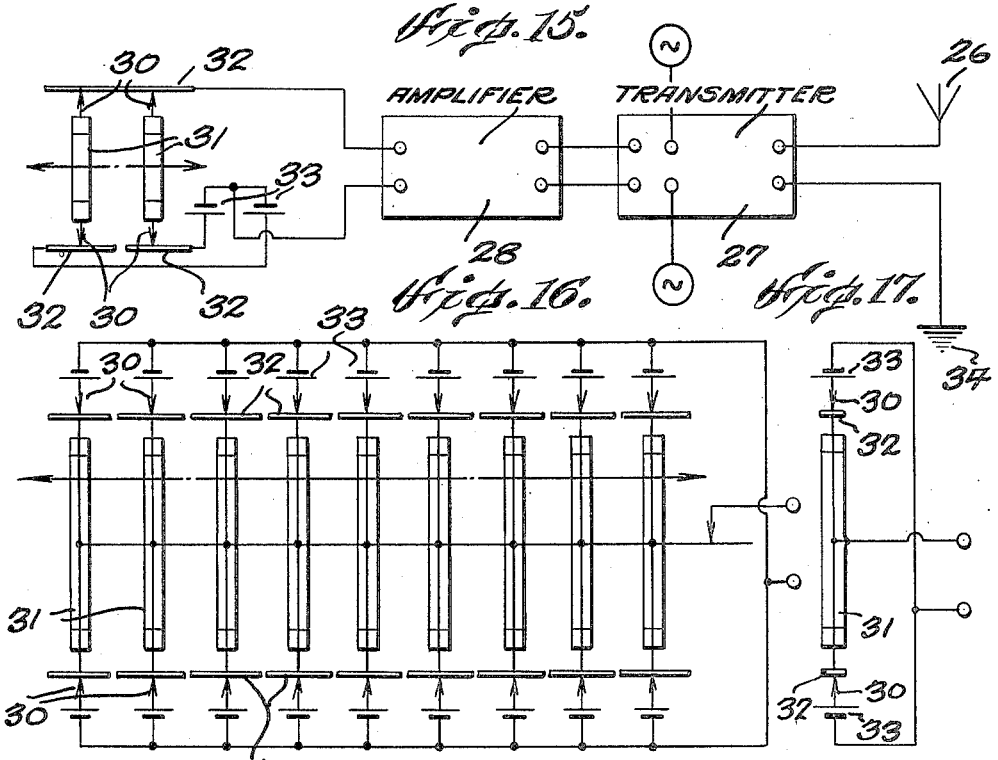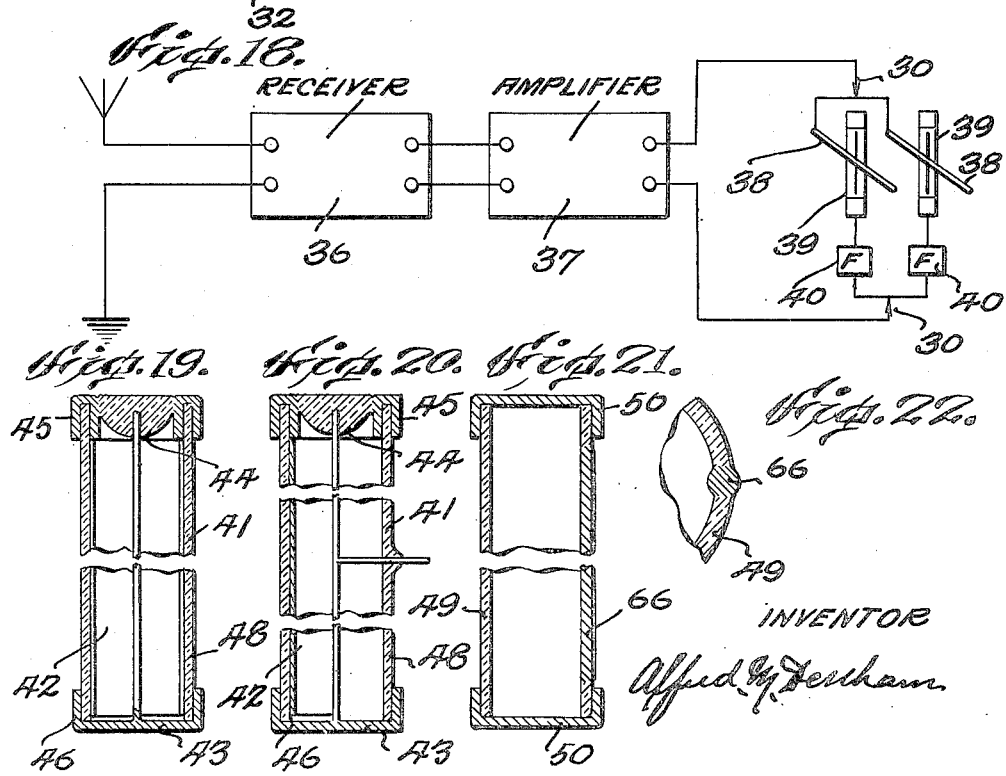

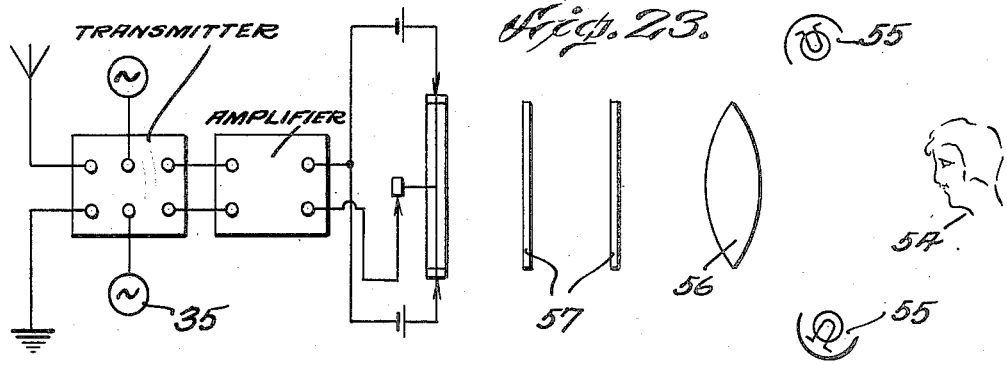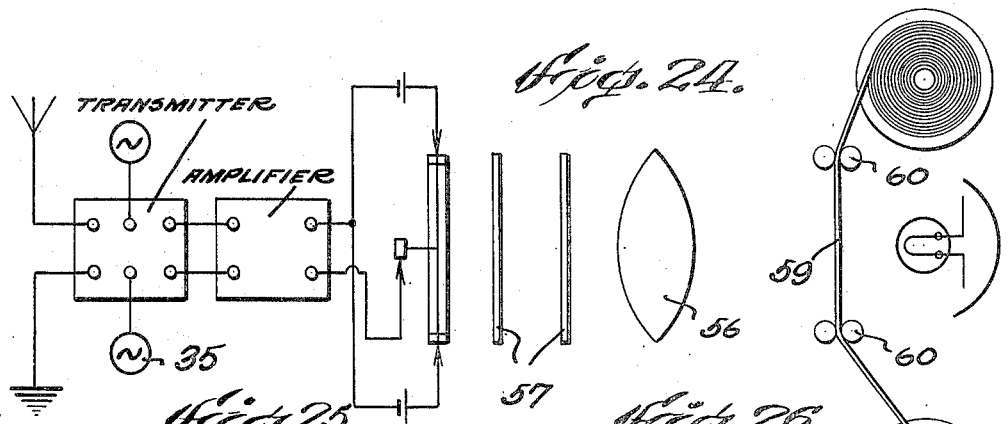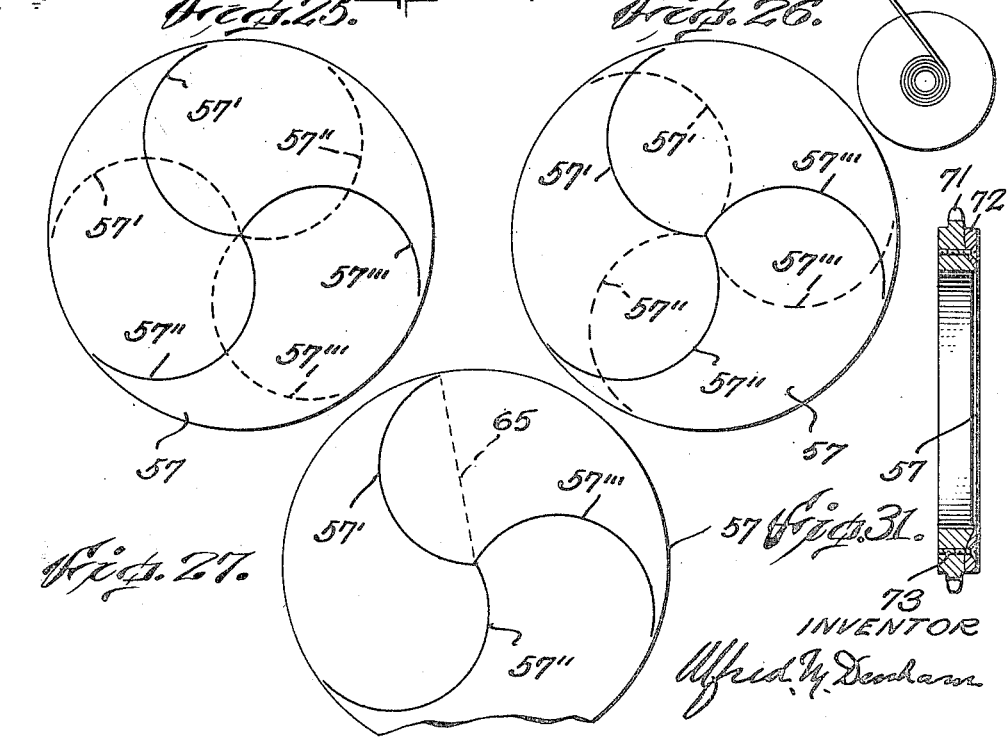

Dec. 18, 1934.  A. M. DENHAM  1,984,466
SYSTEM OF MULTIPLE PHOTOTELEVISION
Filed Feb. 16, 1934  5 Sheets-Sheet 5
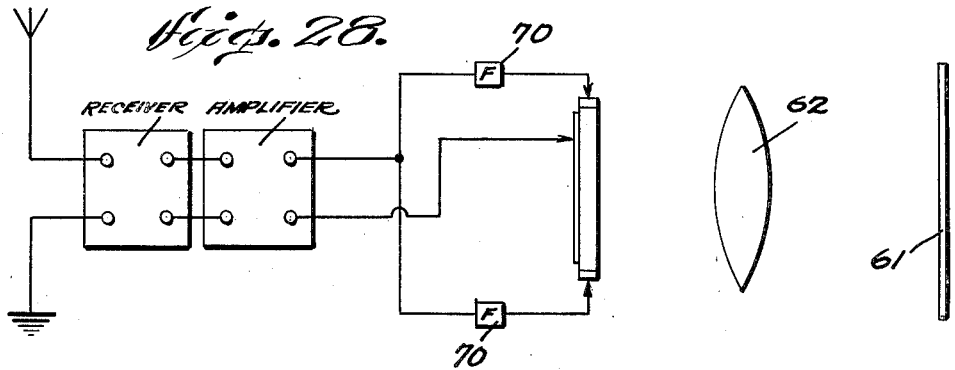
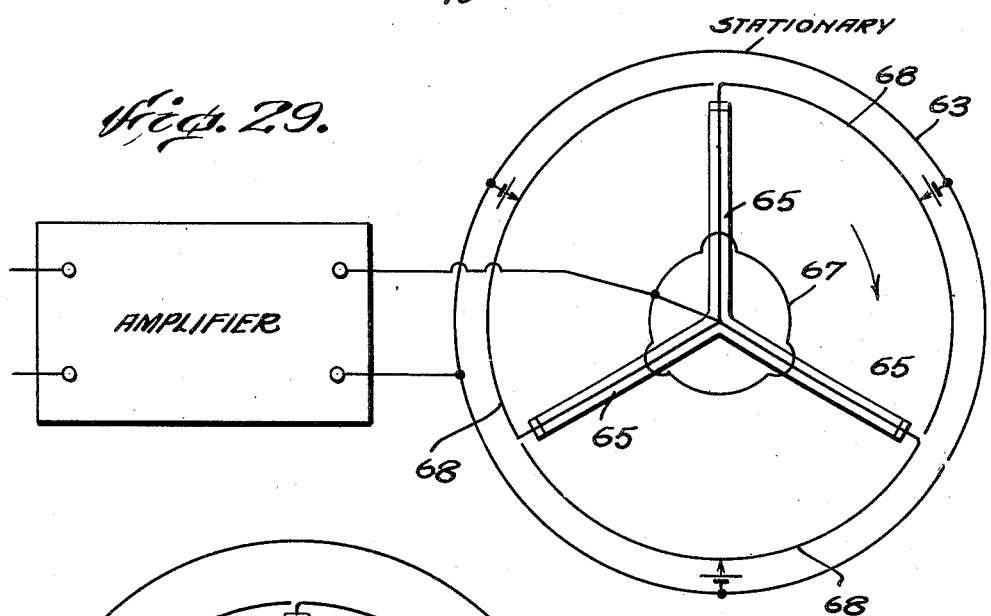
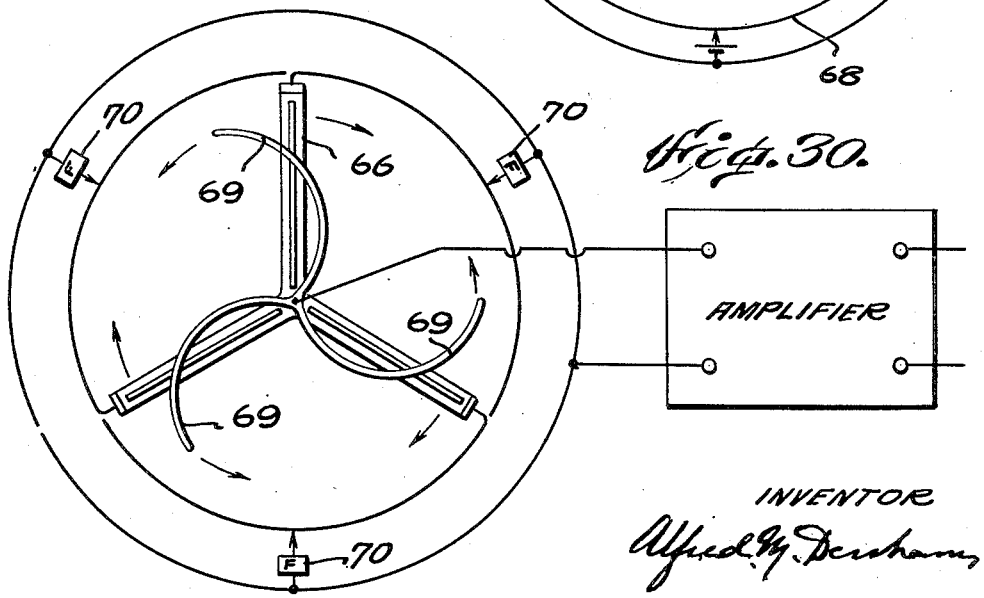
INVENTOR
Alfred M. Denham Patented Dec. 18, 1934

1,984,466

UNITED STATES PATENT OFFICE 1,984,466

SYSTEM OF MULTIPLE PHOTOTELEVISION

Alfred M. Denham, Spokane, Wash.

Application February 16, 1934, Serial No. 711,583

15 Claims. (Cl. 178—6)

My invention relates to television systems and more particularly to a system in which a plurality of areas of the subject are televised simultaneously.

An object of my invention is to produce a new system of television whereby the field of view may be greatly enlarged relative to the size of the scanning apparatus, rendering the device more practical.

Another object of my invention is to scan a plurality of areas of the subject simultaneously and to reconstruct the image by combining the separate areas into a complete image.

Another object of my invention is to scan the whole subject by each of a plurality of scanning elements which act simultaneously, and to reconstruct the image by superposing the complete images formed by an equal number of image reconstructing elements.

Another object is to reproduce the image in black and white.

Another object is to reproduce the image in natural colors by using a plural number of photocells at the transmitter which are separately responsive to different color components of the subject and utilizing the currents generated thereby to control the production of similar color components in the reproduced image.

Referring to the drawings:

Figures 8, 9 and 10 are schematic diagrams showing the scanning action of this modification.

Figures 11, 12, and 13 are views showing the shutters in superposed position.

Figure 1:
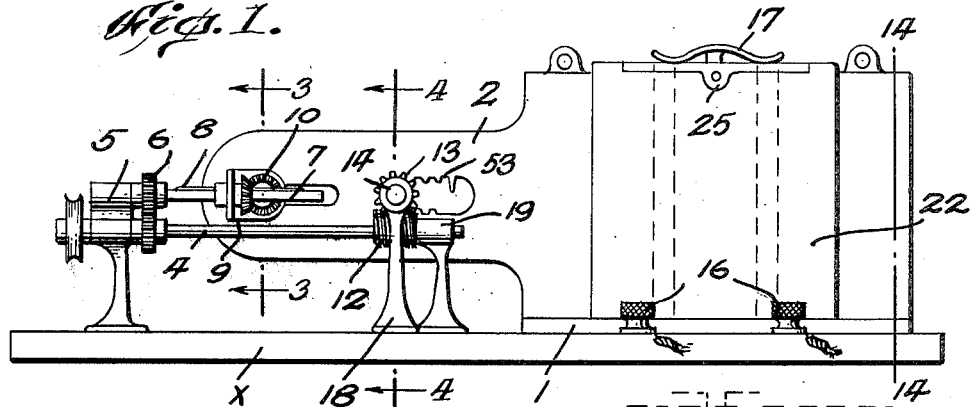
Figure 1 is a side elevation of one modification of my invention.
Figure 2:
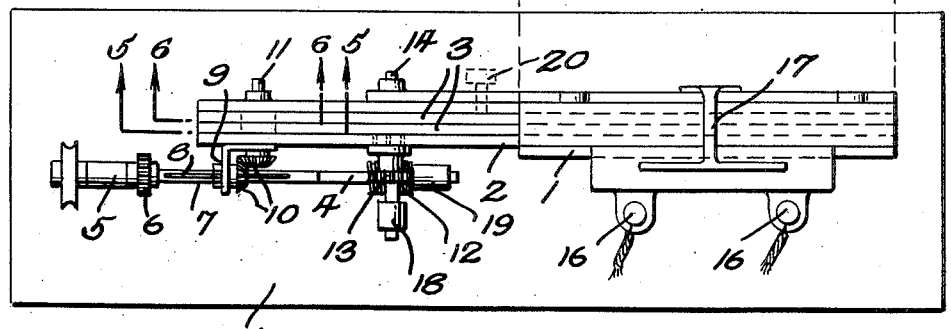
Figure 2 is a plan view of the same modification.
Figure 3:
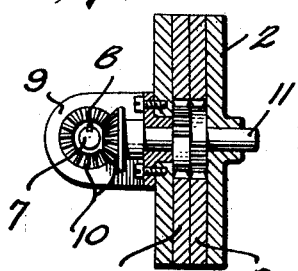
Figures 3 to 7 are detailed views of the shutter driving mechanism of this modification.
Figure 4:
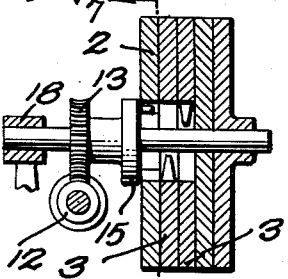
Figure 5:
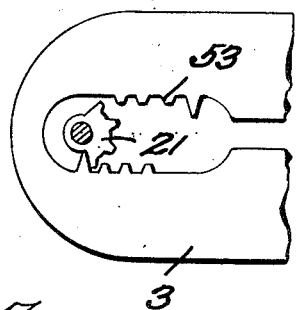
Figure 6:
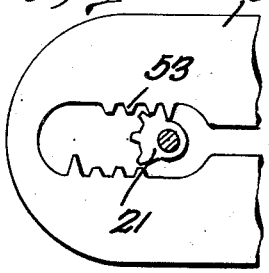
Figure 7:
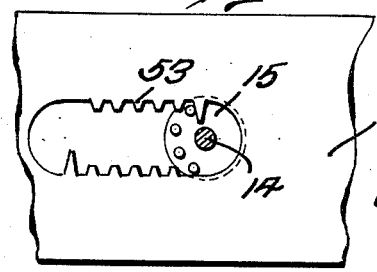

Figure 14 is a cross sectional view of Figure 1 on the line 14—14.

Figure 15 shows the circuit connections for a transmitting device using two photocells.

Figure 16 shows the circuit connections for a transmitter or receiver comprising a plurality of photocells or glow tubes and which is adapted to scan two points simultaneously on each cell or tube.

Figure 17 shows the circuit connections for a single tube or cell adapted to scan two points simultaneously.

Figure 18 shows a receiver suitable for use with the transmitter of Figure 15.

Figure 19 is a cross sectional view of one form of photocell.

Figure 20 is a cross sectional view of another form of photocell.

Figure 21 is a cross sectional view of one form of glow tube.

Figure 22 is a broken transverse cross sectional view of the glow tube of Figure 21.

Figure 23 shows the arrangement for scanning a three dimensional or opaque subject.

Figure 24 shows the arrangement for scanning a transparency.

Figures 25, 26 and 27 are schematic diagrams showing the action of the rotating diaphragms of a second modification of my invention.

Figure 28 shows a scanning and image projection arrangement at the receiver.

Figure 29 shows the circuit connections for the second scanning modification using the diaphragms of Figure 25.

Figure 30 shows the circuit connections for a receiver according to my second modification.

Figure 31 shows the ring gear and mounting for the diaphragms of Figure 25.

Referring to the drawings in detail and more particularly to Figures 1 to 14 thereof, a base $x$ carries a horizontal guide 1 adapted to carry two pairs of reciprocating shutter plates 2 and 3. The outer plates 2 are reciprocated together at a speed of approximately eight reciprocations per second by means of the double rack 53 on plate 2 and the deformed gear 15. Power is transmitted to the latter through drive shaft 4, worm 12, gear 13, and shaft 14. The inner plates 3 are reciprocated by means of double racks 53 on plates 3 and the deformed gear 21. Since shaft 11, which carries gear 21, is journalled in the reciprocating plates 2, the movement of plates 3 will not be a uniform reciprocation about a fixed point but will be a compound movement comprising a reciprocation about a reciprocating reference point. The need for such a movement will become apparent later. Power is transmitted to gears 21 through shaft 11, bevel gears 10, splined shaft 7, and spur gear 6. Driving gear 10 is freely slidable on shaft 7, but is prevented from rotating thereon by spline 8.

Affixed to the reciprocating plates 2 is a housing 22 which carries a plurality of elongated photocells, shown dotted in Figure 1. These cells are carried in channels in the housing which have metallic clips at the ends thereof for engaging the terminal caps of the photocells or glow tubes shown in Figures 19–22. The upper clips make contact with a common brush 17 and the lower clips make individual contact with separate brushes 16. The spacing between photocells is equal to the travel of the reciprocating plates 2, and thus the area scanned by each cell is separate from that scanned by any other cell. The scanning action of the cells and shutters can be more clearly described in connection with Figures 8–13. The slow shutter plates 2, have vertical slits c c' therein which coincide at all times with the positions of the photocells. The fast shutter plates 3 have oppositely inclined diagonal slots a a' and b b' whose horizontal spacing is the same as the slots c c'. When the plates are superposed, as in Figures 8–10, it is seen that only one intersection of slots a b c and slots a' b' c' occurs in front of each photocell at any instant, and thus each photocell is exposed to one point only of the picture. As one shutter 3 is moved to the left and the other to the right, the point of intersection thereof will move along the slot c, a reversal of the motion of the shutter plates causing a reversal of travel of the intersection of the slots. Slots a and b must reciprocate about slot c as a center in order to cause the intersection thereof to follow slot c. The picture projected upon the transmitting scanner will have a height equal to the length of the slots cc' and a width equal to twice the spacing between slots, center to center.

It is obvious that the above disclosure is applicable to a picture reconstructor by substituting glow tubes for the photocells.

The currents generated by the action of the light from the image may be amplified and transmitted directly over metallic channels or they may be used to modulate separate carrier frequencies for wire or wireless transmission. The latter is shown schematically in Figure 15. At the receiver the currents when received directly over separate channels would be amplified and applied to the glow tubes of a similar scanner. Two general methods of utilization of modulated carrier frequencies at the receiver are contemplated. First, the modulated carrier frequencies may be demodulated to produce an undulating current similar to that produced by the photocells. Second, the modulated carrier frequencies may be amplified in separate or common amplifiers, and applied directly to the glow tubes. Where a common amplifier is employed, discriminating filters are used to direct the carriers to their respective glow tubes. Such filters are indicated at FF in Figures 18, 28 and 30.

The second modification of my invention is shown in Figures 25, 26, 27, 29, 30 and 31. This modification consists of two opaque discs having spiral or semicircular slots therein extending from the center substantially to the periphery of the disc. Each disc has the same number of slots and the slots in one disc are spiralled in the opposite direction from the slots in the other. As the discs are driven in opposite directions at slightly different speeds by a conventional driving means, one form of which is shown as a ring gear 71 in Figure 31, the intersections of the slots, which determine the points being scanned, move substantially radially. By virtue of the fact that the speeds of the two discs are different, the succeeding line will not coincide with the first scanned, and the whole area will be scanned in a period determined by the difference in speed of the two discs.

As in the first modification, attached to one disc is a circular housing having channels therein which coincide with the path of the slits and are adapted to carry elongated photocells similar to those of Figures 19 and 20. The channels contain metallic contact clips at the center and at the periphery for engaging the terminal caps of the photocells. The outer clips connect to separate commutator segments, all of which rotate with the assembly and each of which subtends an angle equal to that between adjacent photocells. The number of outgoing transmission channels is equal to the number of cells and a stationary brush from each channel contacts with each commutator segment in turn as the assembly is rotated, see Figure 29. The center clips are joined together and connected to a slip ring, from which a brush makes connection to a lead common to all the channels. In lieu of several separate photocells or glow tubes, a single star shaped cell or tube may be used.

In order to simplify the construction of the photocells in the case of a transmitter, above, or of the glow tubes when the above arrangement is used as a receiver, the slits which travel with the glow tubes or photocells, the channels, and the tubes or cells themselves, may be made straight, as shown in Figures 27, 29 and 30, and the slit made curved in order to effect a traveling intersection. This modification has the advantage also that the image may be scanned in radial lines with a very slow rotational speed of the glow tubes or photocells. In the latter case, the disc carrying the curved slits would rotate through the angle between slits while the glow tubes or photocells and the accompanying assembly would rotate the width of the radial slit.

A modified form of receiver is shown in Figure 30. Instead of using a spirally slotted disc for limiting the visible glow to an elementary area, this receiver produces a single glow successively at a plurality of desired points. It consists of a plurality of glow tubes or a single star shaped glow tube 66 which has a plurality of separate electrodes connected to individual commutator segments. The common electrode, instead of being fused into the envelope as is the common terminal of Figure 29, comprises a star shaped electrode 69 which rotates independently of the glow tubes and at a speed comparable to the disc with spiral slots. Since the arms of the common electrode are spiral shaped, the glow, which occurs in the tube adjacent the arm, will travel along the tube.

In order to energize the glow tubes, it is necessary to apply a modulated high frequency between the common electrode and each of the individual electrodes, since the energization is by induction and not by conduction. It is thus expedient to apply the modulated carriers directly to the tubes through filters F without previous demodulation.

Figure 18 shows the latter principle applied to a receiver using the reciprocating motion of the first modification. The diagonal electrodes 38 correspond in spacing, inclination, and motion to one set of the diagonal slits of Figures 8–13.

The elongated photocell of Figure 19 comprises a transparent envelope 41, coated upon the inside with light sensitive material 42. A metallic cap 45 makes contact with the coating 42 and serves as a terminal to engage the mounting clips. A metallic cap 46 seals the other end of tube 41, supporting and acting as a terminal for the filamentary anode 43. The other extremity of anode 43 is supported in a glass bead 44, which also seals this end of the tube.

Figure 20 shows a modification of the photocell suitable for use with a transmitter of the type shown in Figure 16, wherein each envelope encloses two cells, each cell scanning an individual point of the picture. The common anode 43 is supported by beads 44 at each end. Metallic caps 35 contact with separate cathode areas 42.

Both cells 19 and 20 are suited to the star formation and may be made into a single star. In the modification of Fig. 19, either the cathode 42 or anode 43 may be the common terminal. In Figure 20, anode 43 would be the common terminal and the cathodes separate.

Receiving glow tubes may also be made in the form of Figures 19 and 20. In this case, a metal foil or deposit is substituted for the coating 42 and the tube filled with an inert gas of the proper pressure.

In Figure 21, the anode 66 is sealed directly into the wall 49. Contact can then be made directly with the outside of the anode. Caps 50 seal the tube and constitute terminals for the cathode of the photocell or glow tube.

The photocells of the rotating form of transmitter shown in Figure 29 each scan the whole image in turn. If then each of the photocells is made responsive to a different color component of the image, and at the receiver, the corresponding glow tubes are filled with gases which give a glow of the same color, the images will be transmitted in its natural colors. Methods of making the photocells color responsive are well known in the art. Most cells are inherently color sensitive, the frequency of maximum response varying with different photosensitive materials, but this response may be accentuated also by means of color filters placed over the slits which travel with the cells. Inert gases and glow tubes which produce various colors when energized are also well known in the art.

The invention disclosed herein is obviously susceptible to various modifications and adaptations without departing from the scope of the invention, and is not intended to be limited by the specific constructions herein shown and described except as defined by the scope of the appended claims.

I claim:

1. The method of analyzing a field of view which comprises moving a plurality of analyzing elements simultaneously in a single orbit lying wholly within the field of view and sequentially through corresponding points of said orbit and causing each of said elements to be effective for analysis throughout said orbit.

2. Television apparatus comprising a plurality of analyzing elements, means for moving said elements simultaneously in a single orbit lying wholly within the field of view and sequentially through corresponding points of said orbit, means for causing the simultaneous generation of electric currents corresponding in number to the number of analyzing elements and in intensity to the light and shade of the field of view, a like number of reconstructing elements, means for moving each of said reconstructing elements so that its position corresponds at each instant to the position of the corresponding analyzing element, and means for utilizing each of said electric currents to control the intensity of illumination of the corresponding reconstructing elements to reproduce a picture of the original field of view.

3. A picture dissector for television composing a plurality of linear photocells arranged in the form of a star, means for rotating the photocells about the center of the star so as to subtend a circular area, means for projecting a picture to be transmitted upon the whole of said circular area, means for causing the light from the subject to fall simultaneously upon all photocells and for limiting the light falling on each photocell to an elemental area and means for continuously energizing each of said photocells to cause the simultaneous production of a like number of outgoing electric currents therefrom.

4. A television dissector as in claim 3 in which the photocells have metallic terminal caps and in which the means for rotating the photocells comprises a circular support having slots therein arranged in the form of a star, metallic clips in said slots for supporting the photocells and contacting the terminal caps thereof, a ring gear surrounding and affixed to said support and driving means cooperating with said ring gear for rotating the support at the desired speed.

5. A television dissector as in claim 3 in which the means for causing the light to fall simultaneously on all photocells and for limiting the light falling on each photocell to an elemental area, comprises an opaque diaphragm having transparent circular segments scribed on radials of said opaque diaphragm, said diaphragm being adjacent and parallel to the plane of rotation of said sections and means for rotating said diaphragm at a speed other than the speed of rotation of said photocell.

6. In a transmitter for a new system of photo television transmission, a television dissector as in claim 3 in which the photocells are separately responsive to different color components of the light from the subject and control the production of electric currents corresponding to the color components of the image.

7. A picture reconstructor for television comprising a plurality of individual energized lines, glow tubes sections arranged in the form of a star, means for rotating the glow tubes sections about the center of the star so as to subtend a circular area comprising the image field, means for simultaneously energizing all said sections and to produce a glow in each of an intensity representative of the light and shade of correspondingly positioned elemental areas of a transmitted field of view and means for limiting the glow visible in said image field to an elemental length in each said sections and to cause the visible glow to travel along said sections as the latter are rotated.

8. A television reconstructor as in claim 7 in which the glow tube sections have at least one metallic terminal cap each and in which the means of rotating the sections comprises a circular support having slots therein arranged in the form of a star, at least one metallic clip in each slot for supporting the section and for controlling the terminal caps, a ring gear surrounding the support and affixed thereto and driving means connecting with said ring gear for rotating the support at the desired speed.

9. A television reconstructor as in claim 7 in which the means for limiting the visible glow and for causing it to travel along the glow tube sections comprises an opaque diaphragm having transparent linear areas arranged in the form of a star, said diaphragm being arranged adjacent and parallel to the plane of rotation of said sections and means for rotating said diaphragm at a speed other than the speed of rotation of said sections.

10. A television reconstructor as in claim 7 in which the means for limiting the visible glow to an elemental area for causing the glow to travel along the sections comprises a star shaped electrode arranged adjacent and parallel to the plane of said sections and means for rotating the electrode at a speed other than said sections, and the means for energizing the glow tubes sections comprises an equal number of parallel filters circuits each passing a different one of a plurality of picture modulated carrier frequency currents, the output from each of said filters being connected to a separate one of said glow tubes sections and the outputs from all said filters being connected in common to said star shaped electrode.

11. In a television receiver for a new system of photo television reception a television reconstructor as in claim 7 in which the glow tubes have gas therein which produce different color glows in the individual sections for the production of television in natural colors.

12. In a combination of parts for a new modified system of multiple photo television reception, a metallic base having a large circular bearing, a fibre base having a plural number of fixed electrical terminal points in a circle, and an equal distance apart on said fibre base and the metal base fixed on said fibre base, a gear ring, a circular fibre glow lamp container fixed thereon, said fibre tube container having a plural number of channels extending from center to periphery and said channels having glow tube clips fixed therein, said clips having circular extensions, said extensions made fast to periphery of fibre container and all having a rotary motion in the bearing of the metal base, circular clip extensions on said periphery of tube container in electrical contact with fixed electrical terminal points on the fixed fibre base, said fibre tube container having a plural number of glow tubes having their negative terminals meeting at one common point and said common point being a ring commutator fixed to the center of said tube container, a commutator shaft having an independent bearing, a plurality of ring gears having diaphragms thereon and acting together to produce a certain result.

13. In a combination of parts for a new modified system of multiple photo television reception, a metal base having a large circular bearing, a fibre base having a plural number of fixed electrical terminal points arranged in a circle, and equally distanced apart upon said fibre base and the metallic base fixed on said fibre base, a gear ring, a circular fibre glow lamp container fixed thereon, said fibre cell container having a plural number of channels extending from center to periphery and said channels having photo cell clips fixed thereon, said clips having circular extensions, said extensions made fast to periphery of fibre container and all having a rotary motion in the bearing of the metallic base; circular clip extensions on said periphery of tube container in electrical communication with fixed electrical terminal points on the fixed fibre base, said fibre tube container having a plural number of glow lamps having their negative terminals meet at one common point; said common point being a ring commutator fixed to the center of said tube container, a commutator shaft having an independent bearing, a plurality of ring gears having diaphragms thereon, and all acting together to produce a certain result.

14. In a new modified multiple system of photo electric television transmission, a transmitter, an amplifier, said transmitter comprising a base having a large circular bearing, a rotating gear having annular ring attached to each side with a diaphragm fastened between the gear and one annular ring, the outer periphery of one ring serving as a bearing for the ring gear in the base, a fixed bearing engaging the other annular ring, a second ring gear having an annular ring attached to each side with a diaphragm fastened between one of the annular rings and the gear ring, one of the annular rings on the second gear ring being supported by said fixed bearing, a second fixed bearing for supporting the other annular ring on the second ring gear, spacing washers for said fixed bearing members, clamping means for the bearings, a third ring gear having an annular ring attached to one side thereof, said annular ring engaging the base to support the third ring gear, a photo cell container attached to the other side of third ring gear, a shaft attached to the container, a commutator attached to the shaft, a fixed bearing for said shaft, and photo cells mounted in said photo cell container.

15. In a new modified multiple system of photo television reception an amplifier, a television receiver comprising a base having a bearing therein, a lens member mounted on one side of the base, a ring gear having an annular ring on both sides thereof, one of which engages the bearing to support the ring gear, a glow tube container fixed to the side of the ring gear, glow tubes in said container, a second fixed bearing member which engages the remaining annular ring on the first gear ring, a second gear ring having an annular ring on one side thereof which engages the second bearing, a disk having electrodes therein attached to the other side of the second gear ring, said electrodes extending from the center to the circumference of the disk, a shaft attached to the disk, a commutator having as many conducting rings as there are glow tubes in the container attached to the shaft, a bearing for the shaft, and means for supporting and spacing the bearings.

ALFRED M. DENHAM.